United States Patent [19]

Becker

[11] 4,162,516
[45] Jul. 24, 1979

[54] METER BOX WITH DISCONNECT MEANS

[75] Inventor: Dale F. Becker, Seneca, S.C.

[73] Assignee: Sangamo Weston, Inc., Norcross, Ga.

[21] Appl. No.: 898,360

[22] Filed: Apr. 21, 1978

[51] Int. Cl.² .............................................. H02B 9/00
[52] U.S. Cl. .................................... 361/372; 361/371; 339/198 M; 324/149
[58] Field of Search ...................... 339/37, 82, 198 M; 361/340, 369-375; 200/42 R, 61.7, 61.93, 61.58 R, 61.62, 61.71, 61.72; 324/110, 149

[56] References Cited

U.S. PATENT DOCUMENTS

| | | | |
|---|---|---|---|
| 728,195 | 5/1903 | Brady | 361/340 |
| 2,991,398 | 7/1961 | Strong | 339/198 M |
| 3,397,346 | 8/1968 | Sloop | 361/369 |
| 4,060,297 | 11/1977 | Marshall | 339/37 |
| 4,117,530 | 9/1978 | Reed | 339/198 M |

*Primary Examiner*—Gerald P. Tolin

*Attorney, Agent, or Firm*—William R. Sherman; Kevin McMahon; Edward D. Manzo

[57] ABSTRACT

Disclosed is a watthour meter box which allows simple disconnection of the meter and which includes a meter socket rotatably engaging the meter and a housing structure permitting the meter to be rotated from a first position where the meter is fully connected electrically to the meter socket to a second position where the meter is not fully connected electrically to the meter socket. In a preferred embodiment, the invention includes a stationary front panel having an oblong opening to admit the glass portion of the watthour meter and a movable plate behind the front wall having a similar oblong opening with a gasket reducing the opening to match substantially the perimeter of the glass wall of the meter. By releasing means securing the position of the movable plate, the meter rotates about a pivot member in the lower jaws of the socket and disengages its upper prongs from the upper jaws. Also disclosed are means securing the movable plate in the second disengaged position.

13 Claims, 9 Drawing Figures

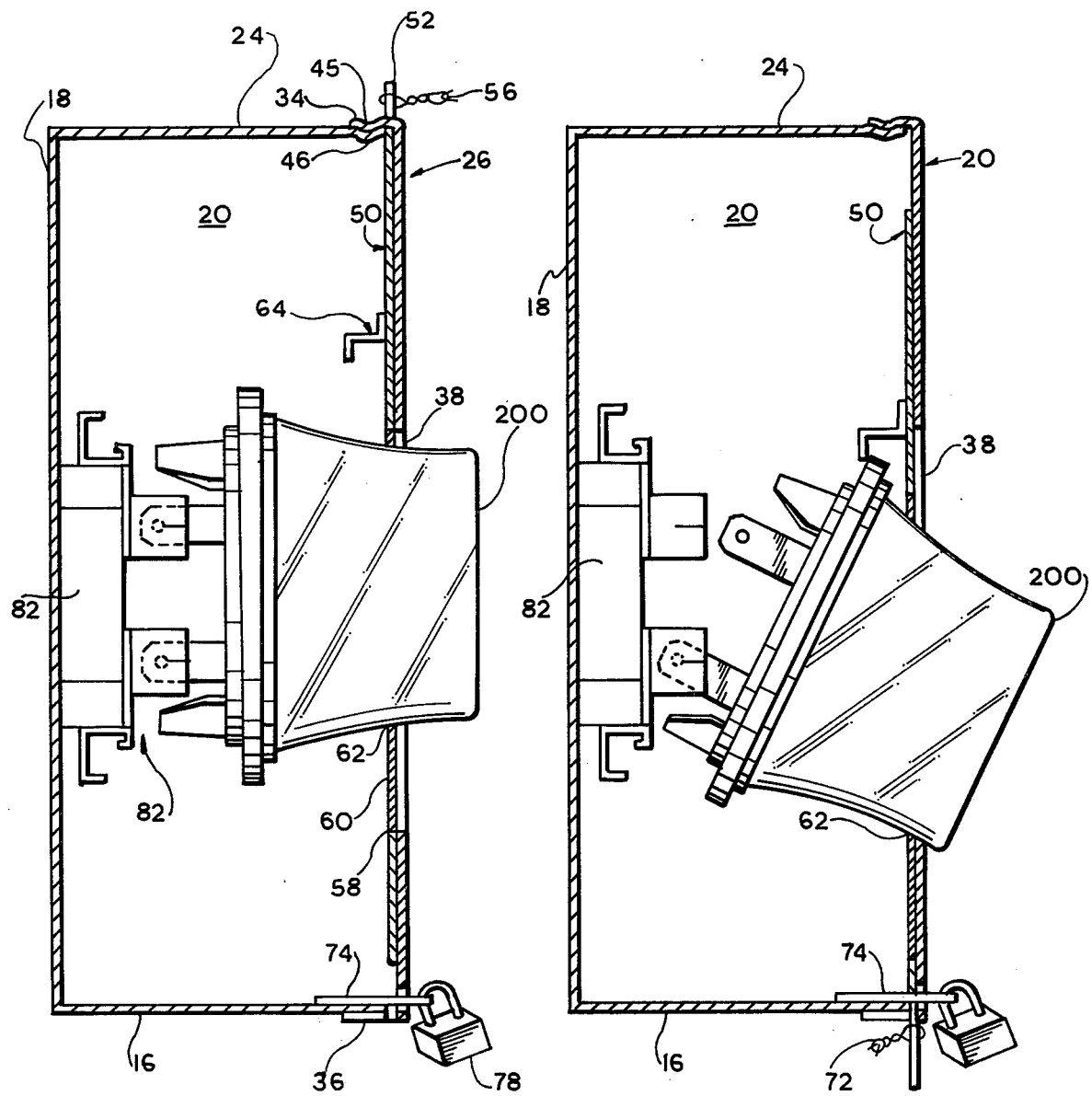

FIG. 3
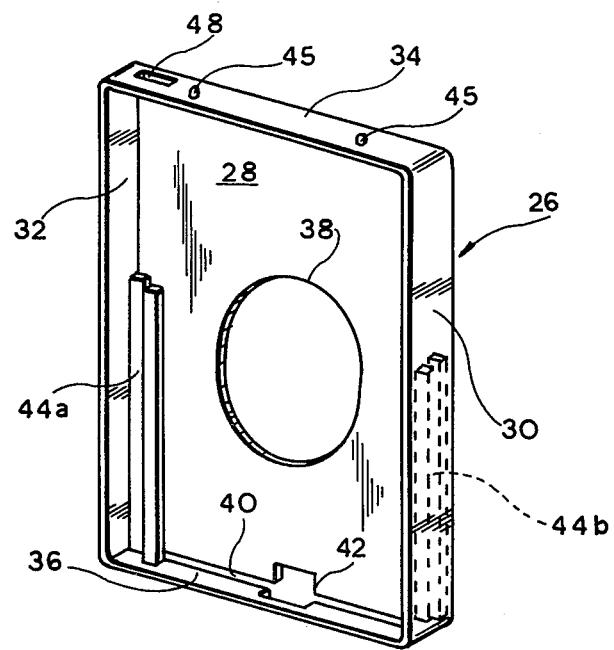
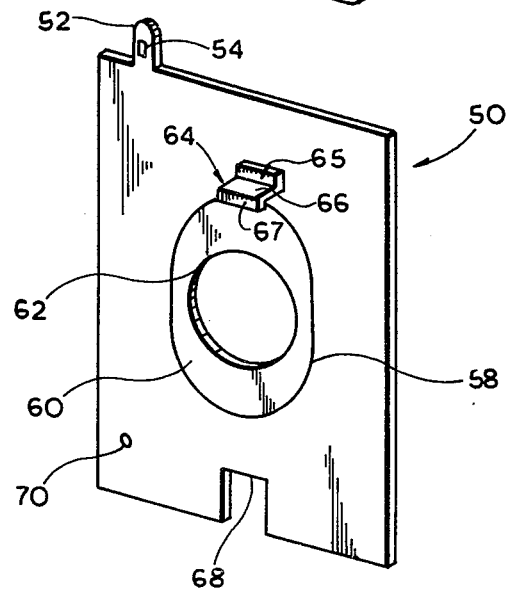
FIG. 4

METER BOX WITH DISCONNECT MEANS

BACKGROUND OF THE INVENTION

The present invention relates to enclosures for watthour meters and more particularly those types having means for disconnecting the meter from the socket.

Providing electrical service to a home owner or small business establishment generally necessitates installation of a watthour meter on the consumer's premises. Frequently the watthour meter is a standard size unit having four prongs in a standard configuration adapted to mate with a meter socket having four jaws. It has been the practice that two of the prongs are interchangeable with the two other prongs if the meter is rotated 180°.

In recent years meter tampering has become a serious problem. Dishonest consumers have achieved a variety of methods for slowing the movement of the meter, disengaging the meter entirely, and even causing the meter movement to run backwards. The latter objective is achieved frequently by disengaging a meter from the meter socket, rotating it 180°, and reinserting it in the meter socket.

While meter enclosures could be devised to prevent access to the meter, such an approach is disadvantageous as a practical matter. From time to time it is necessary for the utility company to be able to disconnect the service at the convenience of the customer or at the convenience of the company. Further, in the case of fire and other disasters, it may be necessary to disconnect quickly electrical service to the consumer's premises.

Accordingly, it is the principal object of the present invention to provide a meter box which will prevent tampering by rotating the meter but which provides an effective and easily activated mechanism to electrically disconnect the meter from the socket.

SUMMARY OF THE INVENTION

In one of its aspects, the present invention comprises a meter box equipped with means to pivotally engage a meter and a housing structure permitting the meter to be rotated from a first position where the meter is connected electrically to a socket to a second position where the meter is not fully electrically connected to the socket. In a preferred embodiment described more particularly below, this is achieved by providing a meter box or housing having a meter socket on the back panel opposite an oval opening in the front panel. Preferably a pivot member is positioned in each lower socket jaw and rotatably engages a lower watthour meter prong. When the meter is mounted, its glass cover extends through the oval opening. The meter may be disconnected by manually grasping the glass portion and causing the meter to rotate about the pivot members, moving it through an arc to a second position in which it is electrically disconnected from the upper socket jaws. Also provided in a preferred embodiment is a plate parallel to and adjacent the front panel covering the meter box and movable with respect to the meter box, having an oval opening similar to the panel opening, and a grommet or gasket mounted thereon to follow the perimeter of the meter glass cover. Preferably, the movable plate includes a portion extending outside the meter box to secure the plate in the first position corresponding to full electrical connection of the meter. Also, the movable plate preferably includes a portion to extend outside the housing when the meter is moved to its second position to secure the plate in such second position.

BRIEF DESCRIPTION OF THE DRAWINGS

Other objects and features of the present invention will become apparent to those skilled in the art from consideration of the appended drawings which illustrate the preferred embodiment of the present invention wherein:

FIG. 2 is a side view with parts broken away of a meter in a first position in the enclosure shown in FIG. 1;

FIG. 3 is a rear view of the front cover of the enclosure shown in FIG. 1;

FIG. 4 is a rear view of the movable plate shown in FIG. 2;

FIG. 5 is a side view with parts broken away of a watthour meter in a second position in the meter enclosure of FIG. 1;

DESCRIPTION OF A PREFERRED EMBODIMENT

Figure 1:
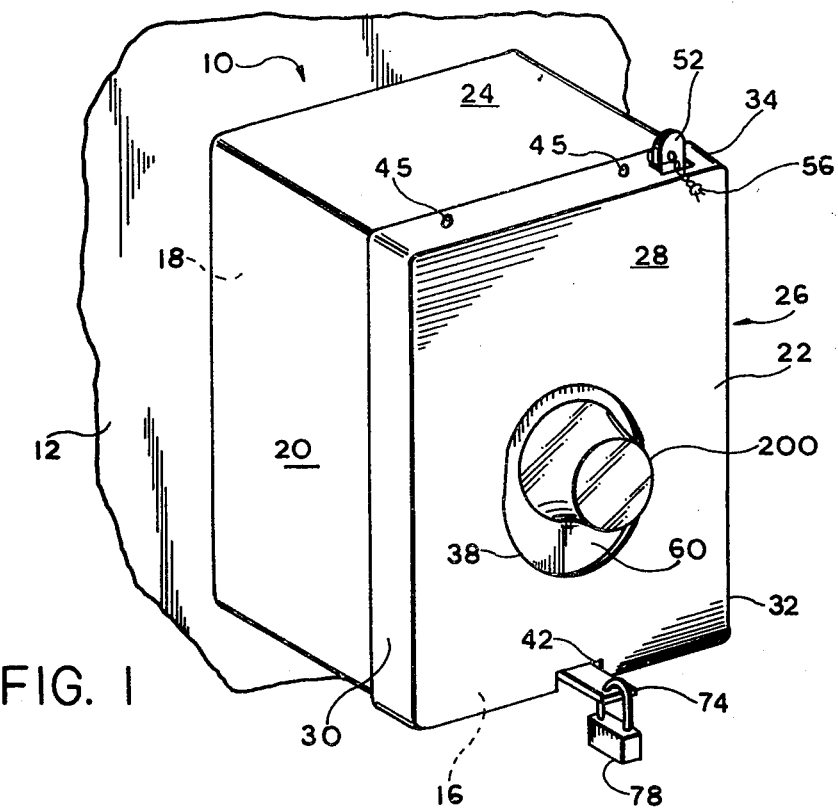
FIG. 1 is an isometric view of an enclosure according to the present invention having a watthour meter mounted therein in its fully connected position.
Figure 6:
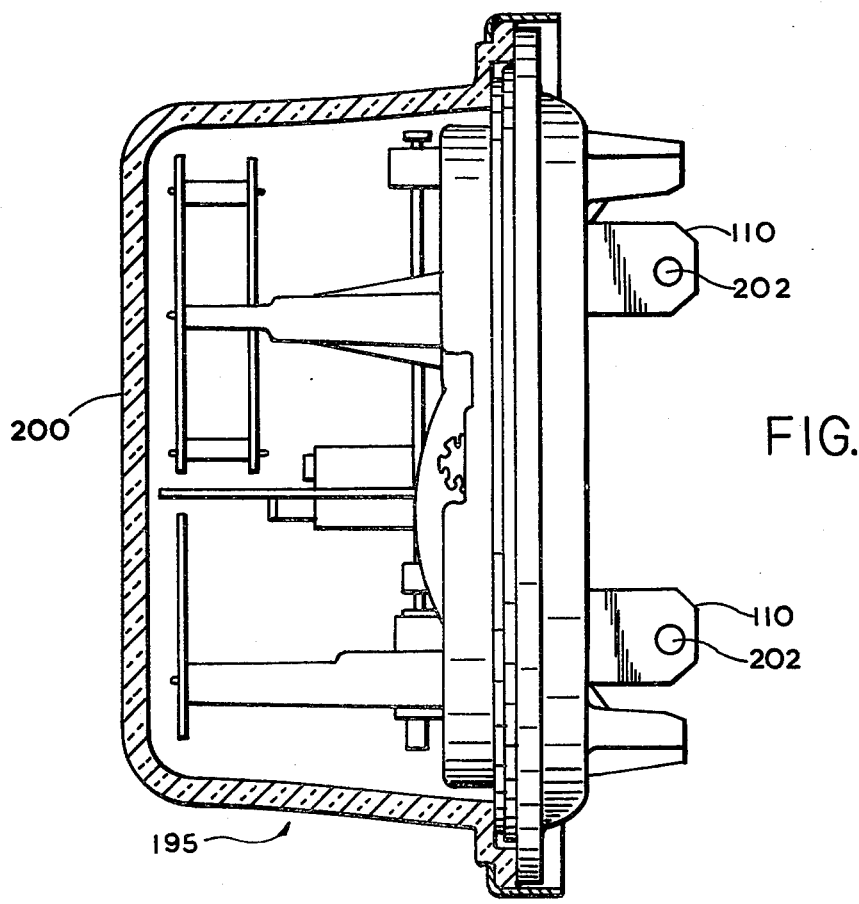
FIG. 6 is a representative side view of a standard watthour meter.

Referring to the Figures, a meter box or housing 10 according to the present invention is shown installed on a wall 12. Housing 10 is a substantially rectangular open front box-shaped steel housing having a bottom 16, a back panel 18, two spaced apart sides 20 and 22 and a top 24. A front cover 26 includes a front panel 28, rearwardly extending side edges 30 and 32, a top 34 and bottom 36.

Front panel 28 includes an oval opening 38 oriented generally vertically, that is, with its major axis being vertical and its minor axis being horizontal. As best seen in FIG. 3, front cover 26 includes a slot 40 extending rearwardly from front panel 28 along bottom 36 and extending from side edge 30 to side edge 32. Front panel 28 also includes a 3-sided notch 42 extending upward from slot 40 and positioned illustratively midway between side edges 30 and 32.

Figure 8:
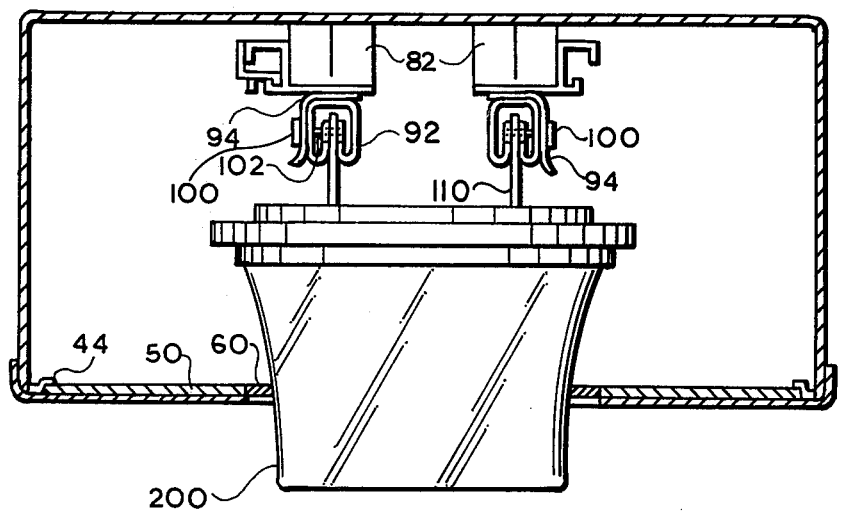
FIG. 8 is a sectional view taken along the line 8—8 of FIG. 7 showing the lower jaws of the meter socket shown in FIG. 7.

Cover 26 also includes tracks 44a and 44b. Track 44a is positioned at the corner of front panel 28 and side 32, while track 44b is positioned at front panel 28 and side 30. Each of the tracks 44 are metallic and, as best seen in FIG. 8, in cross-section has three parts. The front part of each track 44 is parallel to front panel 28 and mounted close to the sides of front panel 28 by welds or rivets, as may be desired. A second part of each track 44 extends rearward from the first part, and a third part of each track 44 extends in a plane parallel to the front panel 28 toward the other track. Tracks 44 engage and guide the movement of a movable plate described infra and hold it parallel to and adjacent front panel 28, allowing the plate to move vertically within the tracks. Cover 26 also includes a slot 48 disposed on top 34. As will be described more fully below, slot 48 receives a finger projecting from the movable plate.

Referring to FIG. 4, a plate 50 fits between the rearwardly extending portions of tracks 44. The thickness of plate 50 is less than the depth of slot 40, so that plate 50 may be inserted into cover 26 by orienting plate 50 in a plane parallel to front panel 28 but slightly displaced rearwardly therefrom, and raising plate 50 through slot 40 and guided by tracks 44. Plate 50 includes an upwardly extending finger 52, aligned with and smaller than slot 48, so that when plate 50 is inserted into cover 26 in the manner described above, finger 52 will extend through slot 48. Finger 52 includes a hole 54 of sufficient diameter to receive a seal wire 56 (shown in FIGS. 1 and 2).

Plate 50 also includes an oval opening 58 which is substantially aligned with oval opening 38 of cover 26 when plate 50 is registered in its topmost (first) position within cover 26 as described above. A flexible gasket 60 is fitted onto plate 50 around opening 58 and may be formed of a flexible synthetic rubber, for example. Gasket 60 includes a central opening 62 which, as will become more apparant, closely follows the perimeter of the glass cover 200 of a watthour meter 195.

Also affixed to plate 50 is a claw 64 having a first portion 65 parallel to plate 50 and welded thereto, a second rearwardly extending portion 66 perpendicular to portion 65, and a third portion 67 extending perpendicularly downward from the free end of portion 66.

Plate 50 further includes a 3-sided notch 68 in its bottom edge so that when plate 50 is disposed in cover 26, notch 68 is aligned with notch 42. However, the height of notch 68 is greater than that of notch 42; that is, notch 68 extends into plate 50 a distance greater than notch 42 extends into front panel 28.

Finally, plate 50 includes a hole 70 at its lower portion. Hole 70 is dimensioned to receive a seal wire 72 similar to wire 56. However, hole 70 is positioned a distance away from the bottom edge of plate 50, as will be described more fully below.

Referring to FIGS. 1 and 2, an arm 74 of heavy gage steel is mounted, by welding for instance, centrally along bottom 16, so that when cover 26 (with plate 50 engaged therein) is positioned on housing 10, arm 74 extends through notches 42 and 68. Arm 74 is equipped with a hole of sufficient dimension to receive the U-portion of a lock 78.

To engage cover 26 with housing 10, top 34 of cover 26 includes a pair of depressions 45 extending downwardly. A pair of depressions 46 on top 24 of meter box 10 are aligned with depression 45 and extend downwardly so that when cover 26 is fitted onto housing 10, depressions 45 next in depressions 46.

Figure 7:
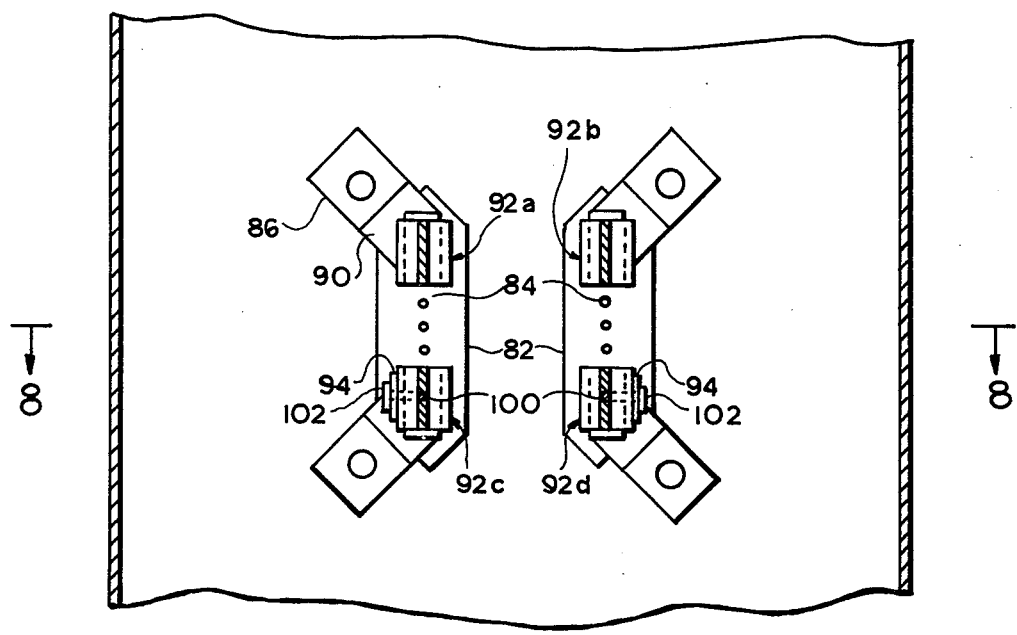
FIG. 7 is a front view of the socket mounted on the back panel of the enclosure shown in FIG. 1.

As best seen in FIGS. 2, 7 and 8, a meter socket 82 including an insulated socket base is affixed by screws 84 or other suitable fastening means to back panel 18 of meter box 10. Socket 82 is provided with standard "lay-in" connector lugs 86 for connecting power lines thereto. Lugs 86 are electrically connected to corresponding jaws 92a–d.

Referring to FIG. 7, upper jaws 92a and 92b are of standard configuration and engage the prongs of a standard watthour meter only frictionally.

Figure 9:
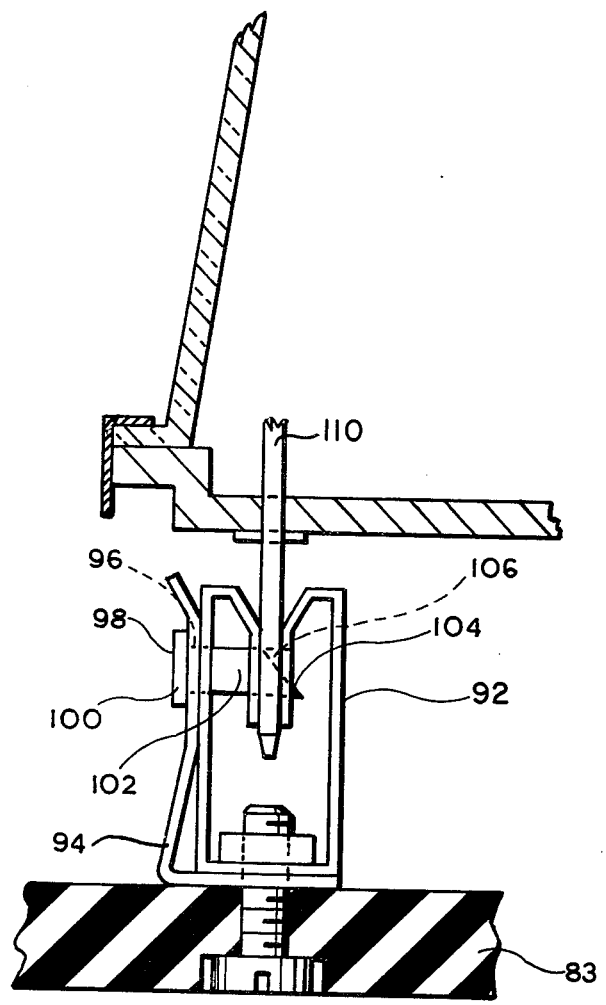
FIG. 9 is an enlarged diagrammatic view of a lower socket jaw equipped with pivotal means according to the preferred embodiment of the present invention.

As shown in FIGS. 7, 8 and 9, each of the bottom two jaws 92c and 92d is equipped with an L-shaped spring 94 having its shorter side mounted between the jaw 92 and the insulated socket base. The longer side of each spring 94 is located along the side of its corresponding jaw 92 and urges inwardly. Said longer side includes an aperture 96 fitted with a pivot member 98 having a flat head 100 and a shank 102. The free end 104 of shank 102 is at an incline of 45°, illustratively, with respect to the plane of head 100. Socket jaws 92 include apertures 106 concentric with spring aperture 96 to admit shank 102. Shank 102 and socket jaws 92 are dimensioned so that inclined free end 104 projects into and through the central portion of the jaws.

A standard power meter or watthour meter 195 includes four male connectors or prongs 110 each positioned on the meter to align with corresponding jaws. Typically each prong includes an aperture 202 but it will be understood that in this preferred embodiment only the lower two apertures 202 are used. Meter 195 is coupled to the upper socket jaws 92a and 92b only frictionally as mentioned above. The lower two prongs 110 may be inserted into the jaws 92c and 92d. In so doing, the prongs move the ramps formed by the incline at ends 104, thereby displacing pivot members 98 despite the urging of springs 94. When each prong 110 is fully seated in its respective socket jaw 92, the hole 202 of the former will be aligned with holes 106 of the latter so that pivot members 98 will pass through the holes by the action of springs 94 and return to stable positions, as shown in FIGS. 8 and 9. Meter 195 now can pivot about an axis passing through apertures 106.

In use, a meter 195 of the standard configuration, including a front portion 200 made of glass or other material, is installed in meter socket 82 in the manner stated above, so that the glass portion 200 of meter 195 extends forward from housing 10.

After meter 195 is installed in socket 82, movable plate 50 is inserted into cover 26 by moving its top edge upward through slot 40 until oval opening 58 is aligned with oval opening 38, at which time finger 52 will extend through slot 48. Maintaining movable plate 50 in this position with respect to cover 26, the assembly 26 and 50 is positioned on the meter box. The front of glass portion 200 passes through opening 62 in gasket or grommet 60, and then through the oval opening 38. When cover 26 approaches housing 10, it should be elevated slightly so that top 34 will be raised over the top 24 of housing 10, allowing depressions 45 to project over depressions 46. It will be recalled that meter 195 is pivotally movable on meter socket 82, and during this alignment portion standard meter 195 may move through an arc, pivoting about members 98. Next, cover 26 is lowered slightly allowing depressions 45 to nest in depressions 46. Seal wire 56 is then inserted through hole 54 in finger 52, so that movable plate 50 is prevented from moving substantially with respect to cover 26 by virtue of the retaining action of wire 56. Next, lock 78 is secured to hole 76. The dimensions of notch 42 are such that cover 26 cannot be swung open beyond the U-shaped portion of lock 78. Accordingly, cover 26 may not be removed from housing 10 until lock 78 is released.

This first position, shown in FIGS. 1 and 2, presents a prospective tamperer with a steel box 10 covered by a heavy steel cover 26 through which a glass meter portion 200 projects. Surrounding glass portion 200 is a grommet or gasket 60 mounted on a steel plate 50.

To disconnect electrically the meter from the socket 82, a serviceman or consumer need only remove seal wire 56, manually engage member 200, and push it downward. The downward movement of member 200 rotates meter 195 about its axis causing the upper two of the male prongs to disengage socket jaws 92a and 92b. The downward movement of glass portion 200 is not obstructed since opening 38 is ovel to accomodate such movement. As meter 195 moves through its downward arc, movable plate 50 moves in a downward direction parallel to front panel 28 and between tracks 44a and b. The bottom plate 50 descends through slot 40 and ultimately exposes hole 70 since notch 68 has a height sufficient to allow hole 70 to appear outside housing 10 prior to engagement of the upper surface of notch 68 with the upper surface of arm 74. As meter 195 rotates and plate 50 descends, claw 64, mounted on plate 50, also descends ultimately to engage the top portion of the meter, as shown in FIG. 5. Seal wire 72 may be affixed to plate 50, by passing through hole 70, to secure the assembly in this second position.

The foregoing preferred embodiment achieves the objects of this invention and provides a meter socket arrangement rotatably engaging a meter and means for rotating the meter from a first position to a second position. Those skilled in the art will appreciate that other arrangements may be devised within the scope of the present invention. For example, jaws 92 might all frictionally engage prongs 110 of meter 195 where a separate means for rotatably engaging meter 195 would be provided proximate socket 82. Another arrangement within the scope of this invention would include separate means for moving meter 195 so that the housing can fully enclose the meter and its glass portion. Such means would have one portion engaging the meter and another portion extending out of the housing for moving the meter. Other arrangements will be apparent to those skilled in the art, and it is therefore preferred that the present disclosure be taken in an illustrative sense, and that the scope of protection afforded be determined by the appended claims.

What is claimed is:

1. A meter enclosure comprising:
   a housing enclosing at least a portion of a meter;
   a meter socket in said housing releasably engaging electrical connecting members of said meter, said meter being in a first position when fully connected electrically to said meter socket and in a second position when not fully connected electrically to said meter socket; and
   a pivot arrangement in said housing pivotally engaging said meter and having an axis about which said meter pivots when moved from said first position to said second position.

2. An enclosure accordng to claim 1 wherein said meter includes a forward transparent portion and wherein said housing includes a cover therefor, said cover having an aperture positioned therein and opposite said meter socket such that said transparent portion extends through said opening when said meter is mounted in said socket.

3. An enclosure according to claim 2 or 13 further including a plate positioned parallel to, adjacent, and behind said cover, said plate including an aperture to admit said transparent portion and being movable with respect to said housing when said meter is engaged by said socket.

4. An enclosure according to claim 3 wherein said plate is slidably engaged by said housing and moves in a plane parallel to the face of said meter when said meter moves from said first position to said second position.

5. An enclosure according to claim 3 wherein said aperture in said cover and said aperture in said plate are oval, and further comprising a gasket arrangement mounted in said aperture in said plate, said gasket arrangement having an opening dimensioned to admit and engage said transparent portion.

6. An enclosure according to claim 4 wherein said housing includes a slot to admit the bottom of said plate.

7. An enclosure according to claim 4 further comprising a member connected to said plate and extending through said housing when said meter is in a selected one of said first and second positions, and means associated with said member to fix said plate relative to said housing.

8. An enclosure according to claim 4 further comprising a claw affixed to the rear face of said plate and positioned to engage said meter when said meter moves to said second position.

9. An enclosure according to claim 4, further comprising an arm affixed to said housing, and wherein said cover includes a notch to receive said arm, and wherein said plate includes a notch aligned with said first-named notch to receive said arm when said plate is in a desired one of said first and second positions, said arm including means to receive a lock.

10. An enclosure according to claim 1 wherein said socket includes a pair of socket jaws for engaging meter prongs and wherein said pivot arrangement includes at least one pivot member operatively engaging one pair of socket jaws whereby said meter may pivot in said housing about said pivot member.

11. An enclosure according to claim 10 further including a spring fixedly fastened to said pivot member at one portion and fixedly fastened to said socket at another portion.

12. An enclosure according to claim 11 wherein said pivot member includes a shank connected at one end to said spring, and wherein said spring urges said pivot member inwardly toward said jaws, said jaws including apertures to admit said shank, said shank including a ramp at the free end thereof, said shank being dimensioned so that said ramp is between said jaws before said meter prong enters said jaws.

13. A combination enclosure meter and disconnect device comprising:
   a socket and a meter having interengaging connecting members, said meter having a forward transparent front portion;
   a housing and cover therefor enclosing said meter and said socket to prevent tampering therewith, said cover including an aperture aligned with said socket, wherein the forward transparent portion of said meter, when connected in said socket, extends through said aperture for allowing reading thereof;
   said socket including pivotal means for allowing rotation of said meter from its normal position fully connected to said socket to a second position in which some of said terminals are disconnected from said socket.

* * * * *

UNITED STATES PATENT AND TRADEMARK OFFICE
CERTIFICATE OF CORRECTION

PATENT NO. : 4,162,516

DATED : July 24, 1979

INVENTOR(S) : Dale F. Becker

It is certified that error appears in the above-identified patent and that said Letters Patent are hereby corrected as shown below:

In the Abstract:

Lines 9 and 12, "oblong" should read -- oval --.

Column 3, line 41, "gage" should read -- gauge --.

Column 3, line 53, "next" should read -- nest --.

Column 5, line 3, "ovel" should read -- oval --.

Claim 13, column 6, line 48, "enclosure meter" should read -- enclosure, meter, --.

Claim 13, column 6, line 62, "terminals" should read -- connecting members --.

UNITED STATES PATENT AND TRADEMARK OFFICE
CERTIFICATE OF CORRECTION

PATENT NO. : 4,162,516

DATED : July 24, 1979

INVENTOR(S) : Dale F. Becker

It is certified that error appears in the above-identified patent and that said Letters Patent are hereby corrected as shown below:

In the Drawing Figures:

Fig. 7, in the socket jaws 92 c and d, flat heads 102 should be labelled 100 and shanks 100 should be labelled 102.

Signed and Sealed this

Twelfth Day of October 1982

[SEAL]

*Attest:*

*Attesting Officer*

GERALD J. MOSSINGHOFF

*Commissioner of Patents and Trademarks*